United States Patent [19]
Gordon

[11] Patent Number: 5,983,553
[45] Date of Patent: Nov. 16, 1999

[54] LIGHTED FISHING LURE

[76] Inventor: Michael D. Gordon, 2643 7th St., Apt. A, Santa Monica, Calif. 90405

[21] Appl. No.: 08/751,711

[22] Filed: Nov. 18, 1996

[51] Int. Cl.$^6$ .......................... A01K 75/02; A01K 85/00
[52] U.S. Cl. ............................................ 43/17.6; 43/42.32
[58] Field of Search .................................. 43/17.6, 42.12, 43/42.32, 42.33, 42.31

[56] References Cited

U.S. PATENT DOCUMENTS

| | | | |
|---|---|---|---|
| 1,831,178 | 11/1931 | Horber | 43/42.32 |
| 1,833,241 | 11/1931 | Wright | 43/17.6 |
| 2,002,135 | 5/1935 | Barton | 43/17.6 |
| 2,202,519 | 5/1940 | Ferris | 43/17.6 |
| 2,217,565 | 10/1940 | Seigle | 43/17.6 |
| 2,550,988 | 5/1951 | Flournoy | 43/17.6 |
| 2,552,224 | 5/1951 | Setterblade | 43/17.6 |
| 2,897,623 | 8/1959 | Flournoy | 43/17.6 |
| 3,494,063 | 2/1970 | Treaster | 43/42.32 |

*Primary Examiner*—Kurt Rowan
*Attorney, Agent, or Firm*—W. Edward Johansen

[57] ABSTRACT

A lighted fishing lure includes a rod, a collar, a light source, an electrical source, first and second tubes, first and second caps. The rod has a first end, a second end and a groove which is disposed between the first and second ends and is formed out of a light transmitting plastic material. The collar is mechanically coupled to the rod adjacent to the groove thereof. The light source is mechanically coupled to the collar. The electrical source is mechanically coupled to the collar and electrically coupled to the light source. The first and second tubes are concentrically aligned and rotatively coupled to the rod and disposed between the groove and the first and second ends, respectively. Each of the first and second tube has an outer sidewall through which the output of light passes. The first and second caps secure the first and second tubes to the rod. Each of the first and second tubes has a plurality of fins which rotatively drive the first and second tubes counter-clockwise and clockwise about the rod.

6 Claims, 4 Drawing Sheets

LIGHTED FISHING LURE

BACKGROUND OF THE INVENTION

This invention relates to fishing lures and more particularly to lighted fishing lures.

U.S. Pat. No. 5,392,555, U.S. Pat. No. 5,175,951 and U.S. Pat. No. 5,076,003 teach lighted fishing lures. In order for an illuminated fishing lure to be useful to either the sport or commercial fisherman a number of criteria must be met; some of which are mandated by the physiology of the fish, and others by the physical and financial needs of the fisherman. Foremost, the light must be introduced into the fish's environment in a manner most likely to attract the fish. Concurrently, the lure must also satisfy the fisherman's need for a durable and inexpensive lure. Additionally the lure must be light and small enough for the fisherman, particularly the sport fisherman to use with his customary tackle.

Both scientist and fishermen are uncertain of the specific reasons light attracts fish. Many postulate that light mimics the luminescence that some fish prey and fish roe exhibit naturally. Light has been used as an attractant since prehistoric times in native fishing techniques which in the main have been successful.

In recent years much research has been undertaken to ascertain the role of light and vision in the functional life of fish. In particular much attention has been directed to learning which behaviors are light controlled since with this knowledge fishing strategies can be devised which are more likely to be successful. In his articles, entitled "Fish Vision and Applied Research" and "Absolute Thresholds" J. H. S. Blaxter has demonstrated two interrelated light dependent functions. Many fish feed by sight and the amount of feeding activity is proportional to the amount of light available. Feeding is usually combined with the light dependent behavior of vertical migration. He found that light becomes a controlling factor when its intensity exceeds $\frac{1}{10}$ millecandela. Below this level light cannot attract fish to feed, or to migrate, or to school.

Significant scientific research in the past few decades has provided much information about how the light should be introduced to the fish's environment in order to successfully attract the fish to strike the lure. In his article, entitled "Behavioral Studies of Vision in Fish and Possible Relationships to the Environment," W. R. A. Muntz has examined the response of fish to monochromatic light against a broad spectrum polychromatic background. The findings indicate several peaks of sensitivity depending on the wavelength of the monochromatic light. The highest sensitivity was at a wavelength of approximately 430 nanometers in the blue region. Since the conditions of this study duplicate the way in which a fish is likely to see the light given off by a lure this study indicates the light color which will attract fish and which a lure must exhibit if it is to successfully induce a fish to strike the lure.

Muntz's studies has also showed that the size of the stimuli and the absolute intensity of the light stimuli were also important in gaining response by fish. Small light sources having intensities much higher than the threshold requirement were far more effective in causing response. He related that fact to the way in which the various receptors in the fish's eye function.

In her article, entitled "Behavioral Studies of Discrimination of Visual Orientation," F. C. Volksmann has demonstrated that light can be used to condition fish. She used Pavlovian techniques with light stimuli to cause fish to feed and perform other tasks. In her studies she found that light in order to be effective had to be of high intensity since fish acuity to light is low. Also that the same light and regularity of duration was necessary. Duration was also important since the fish had to have the light stimuli continuously to respond to it. The fish had to view the light directly in front of the eye in order to respond since apparently the fish have no appreciable peripheral vision. The light also had to cover a large arc of the fish's vision in order to be effective again because of the low acuity of the fish eye to light. All of the above-mentioned articles are contained in NATO ADVANCED INSTITUTE ON NEW APPROACHES TO THE STUDY OF VISION IN FISH, edited by M. A. Ali, Plenum Press, New York, 1974.

Knowledge of fish physiology dictates that a lighted lure in order to effectively attract fish to strike must have the following characteristics. The light must be of high intensity; it must have a high emittance in the blue range; it must be of long duration; and if flashing, the sequence of flashing must have a regularity to the repeat sequence.

U.S. Pat. No. 4,250,651 and U.S. Pat. No. 4,426,803 teach the use of incandescent lamps. The filament attachment in a lamp small enough to be practicable in a fishing lure is not robust enough to withstand the rough handling to which a lure is routinely subjected. A lure is repeatedly cast, or trolled in rough seas, definitely repeatedly struck by fish, and also must be able to withstand being untangled from all manner of debris in the water.

U.S. Pat. No. 3,940,868, U.S. Pat. No. 4,227,331 and U.S. Pat. No. 4,426,803 teach the use of externally mounted LED's. The LED's are mounted either on or in very close proximity to the hooks. These LED's are particularly vulnerable when a fish strikes. Care must be taken when handling the lure in order to preserve the LED. Externally mounted LED'S are easily destroyed when subjected to the routine rough handling given to a fishing lure. U.S. Pat. No. 4,536,985 teaches a flashing LED which emits in concert with the erratic motion of the lure through the water. He contends that there is an additionally benefit from the unpredictable light emission. Current research refutes his contention.

U.S. Pat. No. 4,175,348 also teaches an intermittent flashing LED. The light emission is activated by the motion of a magnetic reed switch which shuttles between two permanent magnets. The movement of the reed switch responds to the erratic motion of the lure in the water resulting in erratic unpredictable light emission. Predictably flashing light is necessary to attract fish. This lure will be heavy in order for the lure to be made durable enough to withstand the shuttling of the reed switch between the two permanent magnets.

For a fiber optic to conduct a useable portion of the light incident on its end the light must be focused to fall at a ninety degree incident angle with the plane surface of the end of the fiber optic. If the light is not so focused by the use of mirrors or lenses the light source must be placed directly in front of the fiber optic so as to directly illuminate the entire end of the fiber. Additionally, if the fiber optic extends beyond the body of the lure it must be of large size since thin optical fibers do not have impact resistance and are more fragile than incandescent lamps filaments.

U.S. Pat. No. 4,347,681 teaches the use of an optical fiber. No attempt is made to focus the light properly on the end of the optical fiber. A plurality of optical fibers extend outside the body of the lure. In order for these optical fibers to be small enough to fit practicably into a lure they will also be too fragile to provide the needed durability. The optical fibers wick water into the electronics thereby causing a short circuit.

U.S. Pat. No. 4,888,905 teaches a fishing lure which includes one or more internal light sources which has a body made of a single fiber optic which may be smooth, multi-faceted or molded in cabochon shapes. The body also contains a power source and associated circuitry for controlling the light source. The body has connecting sections which allows access to the light source, the power source and portions of the circuitry and which permits replacement of the power source.

U.S. Pat. No. 5,172,510 teaches a semi-artificial lure for fishing which visually simulates a live fish by embedding within a clear lure body the head end of a natural marine food, such as a small fish, and attaching thereto an artificial tail made of flaccid plastic streamers which extend from the rear of the lure. Leader line extends from the front of the lure, through the mouth and partial belly of the embedded fish, and out through the rear end of the lure body. Hollow chamber, hidden from sight in belly of embedded fish, accommodates vibration-, scent-, ballast-, and light-producing accessories which attract live fish, without compromising the visual resemblance of the lure to a live bait fish.

U.S. Pat. No. 4,799,327 teaches an illuminated fish lure which has a switched battery powered light source distributing light through separated fiber optic bundles to selected parts of an encapsulating body simulating deep water sea life, preferably a small fish of the luminescent type.

U.S. Pat. No. 5,301,453 teaches a fish lure, including a rigid body and interchangeable body sleeves, which is telescopically attached to the rigid body, whereby a variety of bait configurations can be used on the same lure in accordance with particular fishing conditions.

U.S. Pat. No. 5,524,380 teaches a buoyant body which has a hook extending outward from one end and a pair of rigid fins mounted on and extending angularly outward from opposite sides of the body. The fins are identically constructed and symmetrically mounted on the body. Each fin is oriented on the body such that one major surface is disposed at an angle with respect to a shank of the hook extending through the body. Further, the fins are oriented such that the first and second side edges of each fin are disposed at an angle with respect to a vertical plane extending through the shank of the hook.

U.S. Pat. No. Re 35,160 teaches a fishing lure which has the property of dispersing substantially all incident light in multi-directions results from the application of a glitter containing coating to the external surfaces of the lure body. Ultra-fine glitter particles are employed which are inserted in a highly viscous stage of a liquid mixture of a resin and a hardener and are maintained in a uniform dispersion throughout the entire body of the coating by rotation of the lure body during the completion of the hardening of the resin coating.

U.S. Pat. No. 5,190,366 teaches an arrangement which displays two or more colors of chemiluminescent light simultaneously as a fishing lure. The lure includes a connector body which maintains a plurality of color tubes in a predetermined angular and non-aligned relationship, and is contemplated primarily for use commercially for the catch of swordfish, tuna and the like.

U.S. Pat. No. 4,841,664 teaches a fishing lure which includes a hollow tubular shape that may be molded in the shape of a fish having a continuous side wall, a rounded closure in front and a closable rear opening, wherein the container is generally transparent or at least sufficiently translucent and lightly colored to allow viewing of live bait inside the container. A plurality of holes, one through the center of the front wall and one through the center of the rear closure with at least a pair of holes along the continuous side wall allows leader line to be trained into the front, out through the side wall, back through the side wall and out through the rear wall for attachment of hooks and various further fish luring devices. A fish lure includes a spherical transparent hollow ball having a thread closure between the mating halves of the sphere and a plurality of holes opening into the interior of the sphere to allow free flow of water in and out of the container allowing fishing luring live bait to swim unmolested inside the sphere.

U.S. Pat. No. 4,727,674 teaches a lighted fishing lure which is for use by commercial and sport fisherman in casting or trolling applications. This lure can be attached to nets and draggers. The light source and its control include hardy solid state electronic components. The light sources may be multiple and on or extended from the body of the lure. The light source may be contained in the body of the lure and light brought to the surface by fiber optics.

U.S. Pat. No. 4,653,218 teaches a lightweight fishing lure which includes an elongate, non-rotative shaft having an attachment portion for a fishline at its front end, and a support for an oscillatory member at its rear end. The oscillatory member has tail mounting mechanism serving to detachably mount a tail, with the support defining an axis essentially perpendicular to the axis of the elongate shaft. The oscillatory member is rotatable for a number of degrees in each direction about the perpendicular axis, and a motion producing member is mounted on the elongate shaft at a location intermediate the ends thereof. An operative connection is formed between the motion producing mechanism and the oscillatory member, so that a tail mounted on the oscillatory member will be caused to undertake a motion closely resembling that of a swimming fish. A weight placed outboard of the axis of rotation of the motion producing member prevents the lure from tending to rotate as a result of the passage of water thereover, and quite advantageously, making it readily possible for the fisherman to change the amplitude of oscillation of the tail.

U.S. Pat. No. 5,274,945 teaches an illuminated fishing float for line fishing which uses a tubular container for an illumination source of transparent elastomeric material telescoping into a supporting tube and having an end closure whereby the illumination source can be readily inserted, removed and replaced by detachment of the container and telescoped support tube underwater divers.

U.S. Pat. No. 4,975,809 teaches that the visual attractiveness of a variety of otherwise-autonomous articles may be significantly enhanced through the inclusion of an apertured, internally light-transmissive essentially solid and preferably, peripherally light reflectively coated panel which is edge-illuminated and energized by elements self-contained within the article body. The article may include greeting cards, key-chain medallions, campaign buttons, tree ornaments, dolls and picture-carrying plaques. Article apertures of distributed area, point size or both may be illuminated. Distributed-area display effects may be enhanced through aperture-aligned light-concentrative discontinuities formed in the panel. Enhancement of point-display effects may similarly be achieved through point-aperture-aligned, light-concentrative point discontinuities likewise formed in the panel. Point effects may also be enhanced through the employment of an end-illuminated, aperture-aligned, point-discontinuous optical fiber in conjunction with a subject apertured panel. Bi-directional display effects in subject autonomous articles may be achieved by means of a layered panel having oppositely-projective surfaces. For realizations where increased article thickness is tolerable, color-variation effects may be achieved by the inclusion of an illuminating optical-fiber array whose input ends are themselves illuminated through a multicolored filter ring rotatably-interposed in front of an originating light source.

U.S. Pat. No. 4,617,751 teaches fishing tackle for catching fish with a fishing line which constitutes a light guide, at one end of which the light from a natural or artificial light source can be focused, and at the other end of which a bait with reflecting, luminescent, transmittent or light-scattering properties is located.

SUMMARY OF INVENTION

The present invention is generally directed to a lighted fishing lure which includes a light source and an electrical source electrically coupled to the light source.

In a first, separate aspect of the present invention, the lighted fishing lure includes a rod, a first tube and a second tube. The rod, the first tube and the second tube are formed out of a light transmitting plastic material and have a first end and a second end. The first tube is axially aligned and rotatively coupled to the rod adjacent to the first end of the rod. The second tube is axially aligned and rotatively coupled to the rod adjacent to the second end of the rod.

In a second, separate aspect of the present invention, each of the first and second tube has a plurality of fins which rotatively drive the first and second tubes about the rod.

In a third, separate aspect of the present invention, the light transmitting plastic material of each of the first and second tubes is of a predetermined color.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

Figure 1:
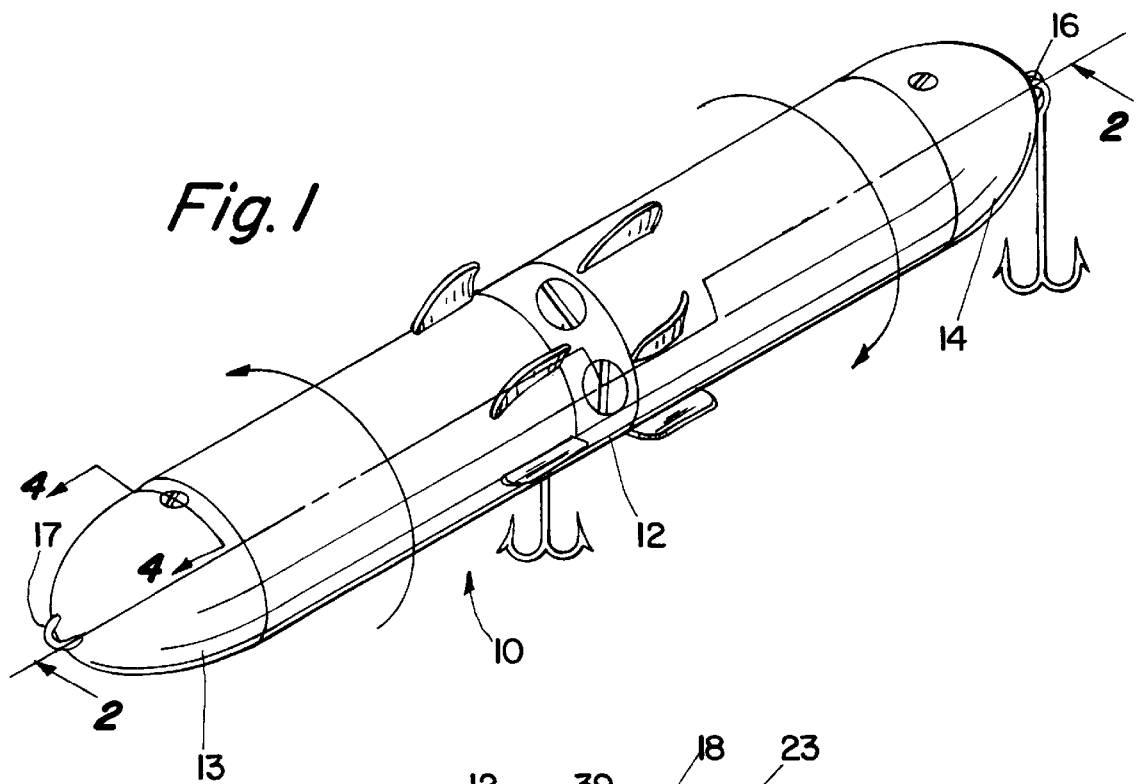
FIG. 1 is a perspective drawing of a lighted fishing lure which includes a first cap, a second cap, a first tube, a collar and a second tube according to the present invention.
Figure 2:
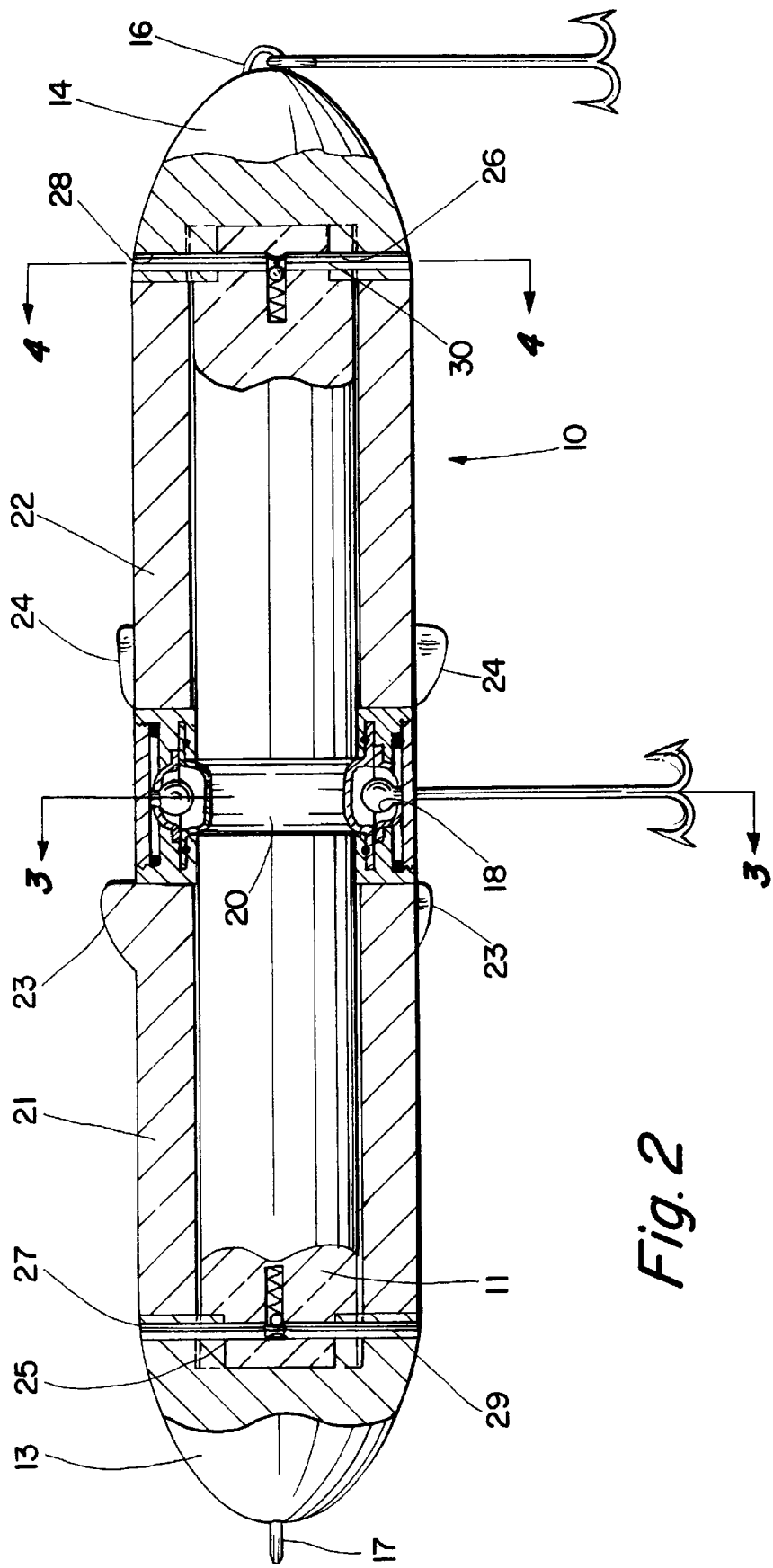
FIG. 2 is a longitudinal elevational view in partial cross-section of the lighted fishing lure of FIG. 1 which also includes a rod taken along line 2—2 of FIG. 1.

Referring to FIG. 1 in conjunction with FIG. 2 a lighted fishing lure 10 includes a rod 11, a collar 12, first cap 13 and a second cap 14, a first hook connector 15, a second hook connector 16, a fishing line connector 17, a light source 18 and an electrical source 19. The rod 11 has a first end, a second end and a groove 20. The rod 11 is formed out of a light transmitting plastic material. The groove 20 is disposed between the first and second ends. The collar 12 is mechanically coupled to the rod 11 adjacent to the groove 20 thereof. The first and second hook connectors 15 and 16 mechanically couple a first hook and a second hook to the collar 12 and the second cap 14, respectively. The fishing line connector 17 mechanically couples a fishing line to the first cap 13. The light source 18 is mechanically coupled to the collar 12. The electrical source 19 is mechanically coupled to the collar and electrically coupled to the light source 19.

Figure 3:
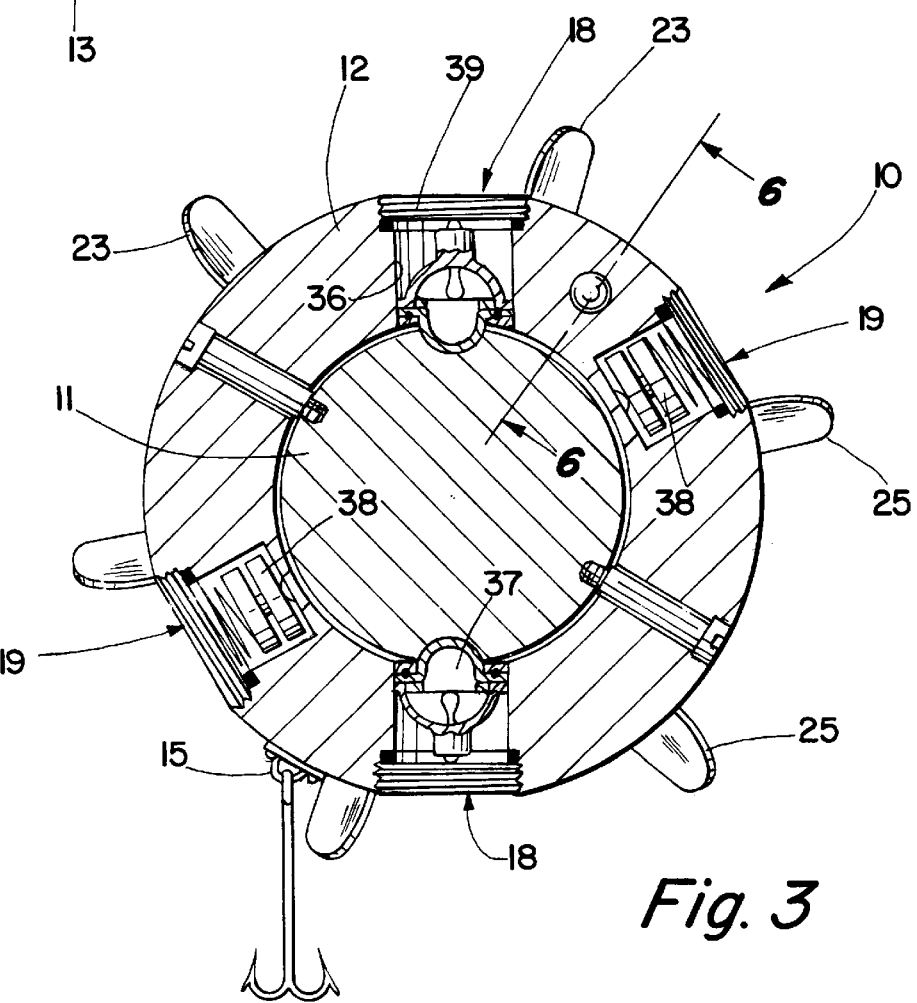
FIG. 3 is a transverse elevational view in cross-section of the rod and the collar of the lighted fishing lure of FIG. 1 taken along line 3—3 of FIG. 2.

Referring to FIG. 2 in conjunction with FIG. 3 the lighted fishing lure 10 also includes a first tube 21 and a second tube 22. The first and second caps 13 and 14 are formed out of a light transmitting plastic material. The first and second tubes 21 and 22 are concentrically aligned and rotatively coupled to the rod 11 and are disposed between the groove 20 and the first and second ends, respectively. Each of the first and second tubes 21 and 22 has an outer sidewall through which the output of light passes. The first and second caps 13 and 14 secure the first and second tubes 21 and 22 to the rod 11.

Referring to FIG. 1 in conjunction with FIG. 2 and FIG. 3 the first and second tubes 21 and 22 have a first plurality of fins 23 and a second plurality of fins 24, respectively. The fins 23 rotatively drive the first tube 21 counter-clockwise about the rod 11. The fins 24 rotatively drive the second tube 22 clockwise about the rod 11.

Figure 4:
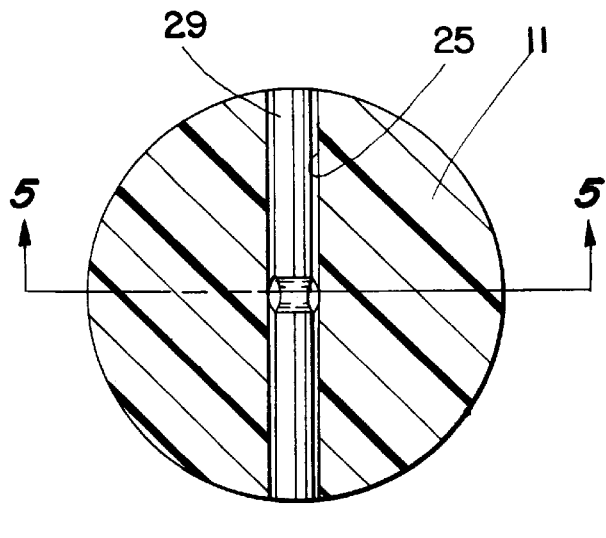
FIG. 4 is a transverse elevational view in cross-section of the rod of the lighted fishing lure of FIG. 1 taken along line 4—4 of FIG. 2.
Figure 5:
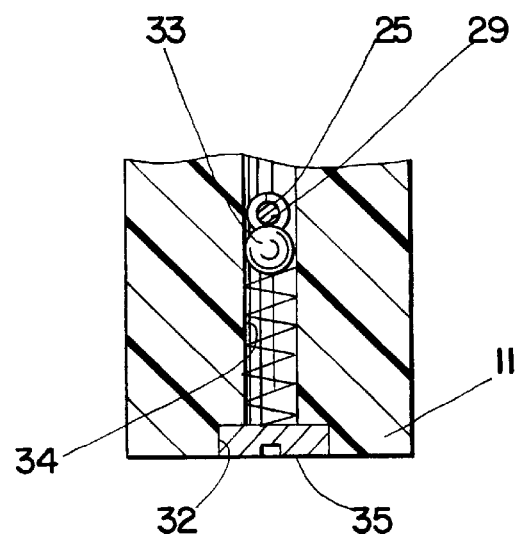
FIG. 5 is a partial longitudinal elevational view in cross-section of the rod of the lighted fishing lure of FIG. 1 taken along line 5—5 of FIG. 4.

Referring to FIG. 2 in conjunction with FIG. 4 and FIG. 5 the first and second caps 13 and 14 have a first bore 25 and a second bore 26. The first and second tubes 21 and 22 have a first bore 27 and a second bore 28 which may be aligned with the first and second bores 25 and 26. A first pin 29 and a second pin 30 are disposed in the aligned bores and secure the first and second caps 13 and 14 to the first and second tubes 21 and 22, respectively. Each of the first and second pins 29 and 30 has a first end, a second end and groove 31 which is disposed between its first and second ends. At the each end of the rod 11 is a threaded bore 32 which is concentrically aligned with the rod 11. A ball 33 and a spring 34 are inserted into each threaded bore 32. A flat-head screw 35 is threaded into the threaded bore 32 at each end of the rod 11 in order secure the the ball 33 and the spring 34 therein so that the first and second caps 13 and 14 are secured to the rod 11.

Figure 6:
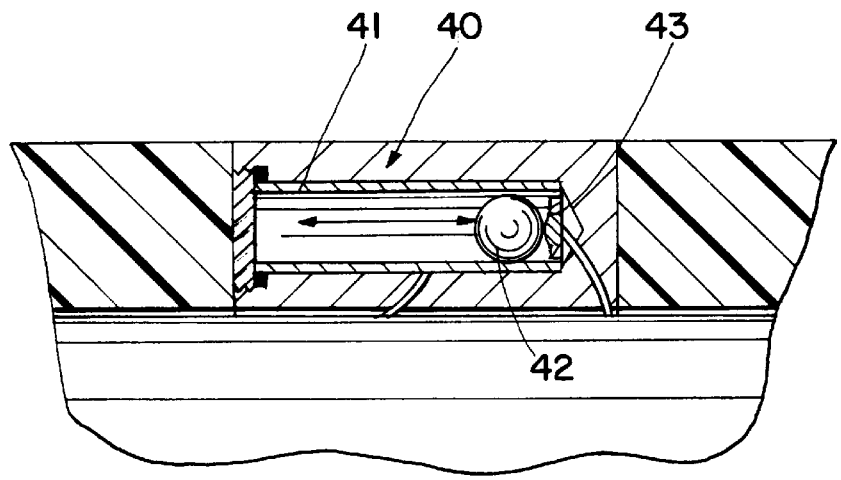
FIG. 6 is an elevational view in partial cross-section of the collar of the lighted fishing lure of FIG. 1 taken along line 6—6 of FIG. 3.

Referring to FIG. 2 in conjunction with FIG. 3 and FIG. 6 the collar 12 has a first set of four threaded bores 36 which are perpendicularly aligned with the groove 20. The light source 18 includes two lamps 37 which are disposed in two of the four bores 36. The electrical source 19 includes two batteries 38 which are disposed in the other two of the four bores 36. Four flat-head screws 39 secure the two lamps 37 and the two batteries 38 in the four threaded bores 36. A switch 40 includes a metal sleeve 41, a ball bearing 42 and a contact tab 43. The switch 40 electrically couples each of the batteries 38 to one of the lamps 37.

Figure 7:
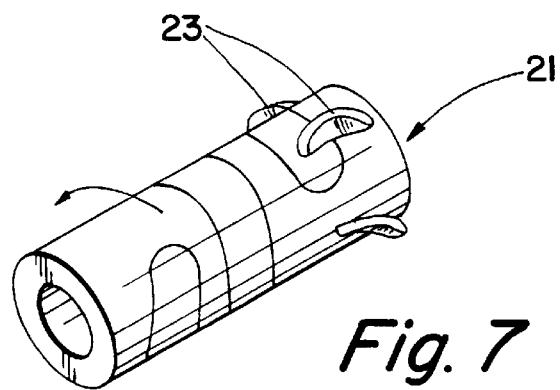
FIG. 7 is a perspective drawing of the first tube of the lighted fishing lure of FIG. 1.
Figure 9:
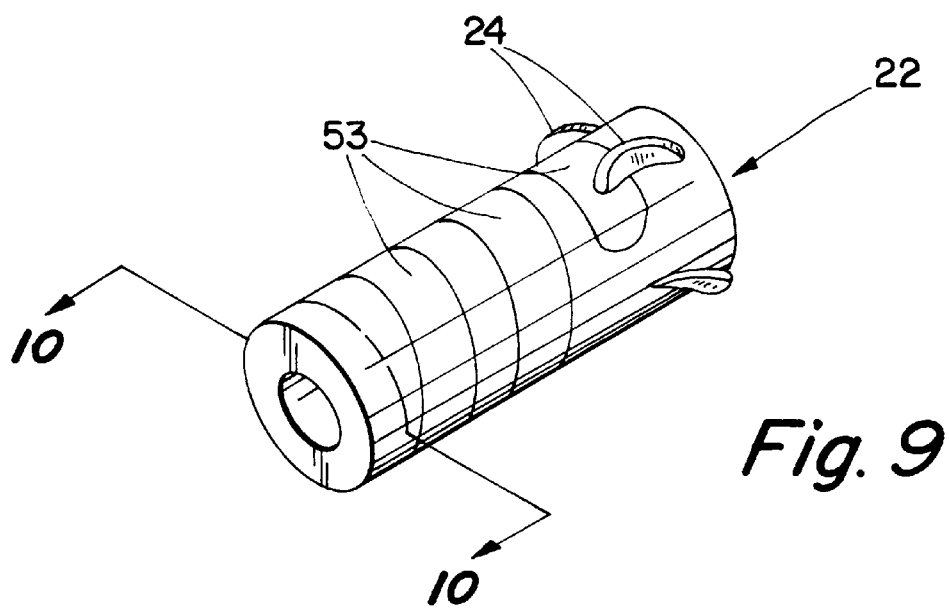
FIG. 9 is pespective drawing of the second tube of the lighted fishing lure of FIG. 1.
Figure 8:
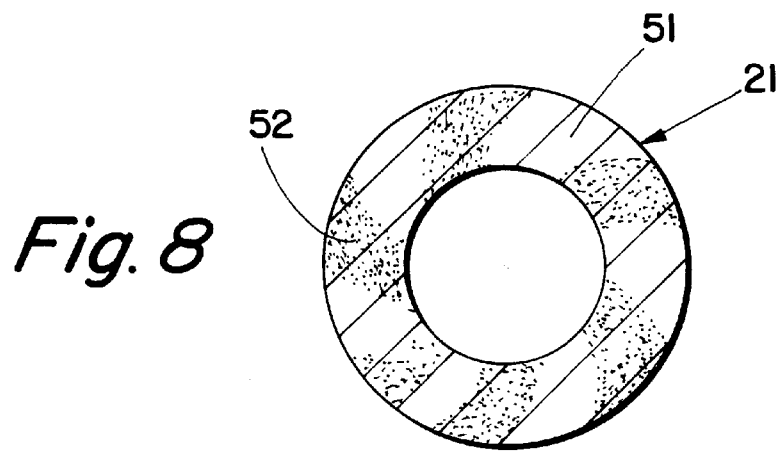
FIG. 8 is a transverse cross-sectional view of the first tube of FIG. 7 taken along the line 8—8.
Figure 10:
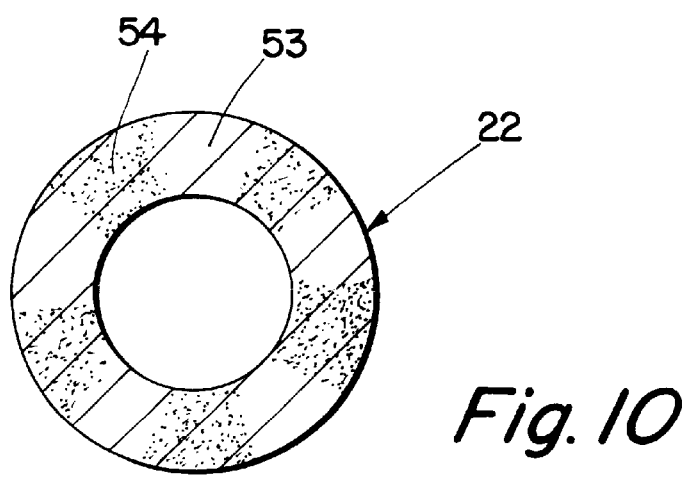
FIG. 10 is a transverse cross-sectional view of the second tube of FIG. 9 taken along the line 10—10.

Referring to FIG. 1 in conjunction with FIG. 7 and FIG. 8 a first plurality of bands 51 of transparent markings are concentrically aligned with the rod 11 and are serially disposed within the first tube 21 and a plurality of opaque markings 52 are distributed on the bands 51 of transparent markings creating an on/off pattern of light which passes through each of the bands 51 of transparent markings. Referring to FIG. 1 in conjunction with FIG. 9 and FIG. 10 a second plurality of bands 53 of transparent markings are concentrically aligned with the rod 11 and are serially disposed within the second tube 22 and a plurality of opaque markings 54 are distributed on the bands 53 of transparent markings creating an on/off pattern of light which passes through each of the bands 53 of transparent markings. Each band 51 and 53 transparent markings, may be of a color which is selected from a group of colors, be distributed on the bands 51 and 53 of transparent markings whereby a varying color pattern of light passes through each of the bands 63, 51 and 53 of transparent markings.

From the foregoing it can be seen that a lighted fishing lure has been described. It should be noted that the sketches are not drawn to scale and that distance of and between the figures are not to be considered significant.

Accordingly it is intended that the foregoing disclosure and showing made in the drawing shall be considered only as an illustration of the principle of the present invention.

What is claimed is:

1. A lighted fishing lure comprising:
   a. a rod which has a first end, a second end and a groove disposed between said first and second ends and which is formed out of a light transmitting plastic material;
   b. a collar mechanically coupled to said rod adjacent to said groove thereof;
   c. a light source mechnically coupled to said collar, said light source generating an output of light;
   d. an electrical source mechanically coupled to said collar and electrically coupled to said light source;
   e. a first tube concentrically aligned and rotatively coupled to said rod and disposed between said groove and said first end, said first tube having an outer sidewall through which said output of light passes;
   f. a second tube concentrically aligned and rotatively coupled to said rod and disposed between said groove and said second end, said second tube having an outer sidewall through which said output of light passes;
   g. a first cap for securing said first tube to said rod; and
   h. a second cap for securing said second tube to said rod.

2. A lighted fishing lure according to claim 1 wherein a first plurality of bands of transparent markings are concentrically aligned with said rod and are serially disposed within said first tube and a plurality of opaque markings are distributed on said bands of transparent markings creating an on/off pattern of light which passes through each of said bands of transparent markings and a second plurality of bands of transparent markings are concentrically aligned with said rod and are serially disposed within said second tube and a plurality of opaque markings are distributed on said bands of transparent markings creating an on/off pattern of light which passes through each of said bands of transparent markings.

3. A lighted fishing lure according to claim 1 wherein said first tube has a plurality of fins which rotatively drive said first tube counter-clockwise about said rod and said second tube has a plurality of fins which rotatively drive said second tube clockwise about said rod.

4. A lighted fishing lure according to claim 1 wherein a first plurality of bands of transparent markings are concentrically aligned with said rod and are serially disposed within said first tube and a plurality of transparent markings, each of which is of a color which is selected from a group of colors, distributed on said bands of transparent markings whereby a varying color pattern of light passes through each of said bands of transparent markings and a second plurality of bands of transparent markings are concentrically aligned with said rod and are serially disposed within said second tube and a plurality of transparent markings, each of which is of a color which is selected from a group of colors, distributed on said bands of transparent markings whereby a varying color pattern of light passes through each of said bands of transparent markings.

5. A lighted fishing lure comprising:
   a. a rod which is formed out of a light transmitting plastic material;
   b. a light source mechnically coupled to said rod, said light source generating an output of light;
   c. an electrical source electrically coupled to said light source;
   d. a tube concentrically aligned and rotatively coupled to said rod, said tube having an outer sidewall;
   e. a plurality of fins which rotatively drive said tube about said rod;
   f. a plurality of bands ox transparent markings concentrically aligned with said rod and serially disposed within said tube;
   g. a plurality of opaque markings distributed on said bands of transparent markings creating an on/off pattern of light which passes through each of said bands of transparent markings; and
   h. a cap for securing said tube to said rod.

6. A lighted fishing lure comprising:
   a. a rod which is formed out of a light transmitting plastic material;
   b. a light source mechnically coupled to said rod, said light source generating an output of light;
   c. an electrical source electrically coupled to said light source;
   d. a tube concentrically aligned and rotatively coupled to said rod, said tube having an outer sidewall;
   e. a plurality of fins which rotatively drive said tube about said rod;
   f. a plurality of bands of transparent markings concentrically aligned with said rod and serially disposed within said tube;
   g. a plurality of transparent materials, which is of a color which is selected from a group of colors, distributed within said bands of transparent markings creating a varying color pattern of light which passes through each of said bands of transparent markings; and
   h. a cap for securing said tube to said rod.

* * * * *